United States Patent [19]
Brandewie

[11] Patent Number: 6,094,530
[45] Date of Patent: Jul. 25, 2000

[54] REMOTELY MONITORING EXECUTION OF A PROGRAM

[75] Inventor: Dirk J. Brandewie, Hillsboro, Oreg.

[73] Assignee: Intel Corporation, Santa Clara, Calif.

[21] Appl. No.: 09/069,527

[22] Filed: Apr. 29, 1998

[51] Int. Cl.[7] .............................. G06F 11/00; G06F 13/00
[52] U.S. Cl. ............................. 395/704; 714/38; 714/39; 714/47; 710/105; 710/126; 710/129; 702/183; 702/182
[58] Field of Search ................... 395/704; 702/182–186; 714/38, 39, 46, 47, 25; 710/52, 104, 105, 126, 127, 129

[56] References Cited

U.S. PATENT DOCUMENTS

| | | | |
|---|---|---|---|
| 5,379,409 | 1/1995 | Ishikawa | 714/37 |
| 5,388,252 | 2/1995 | Dreste et al. | 714/46 |
| 5,630,048 | 5/1997 | La Joie et al. | 714/25 |
| 5,815,509 | 9/1998 | Deng et al. | 710/105 |
| 5,845,152 | 12/1998 | Anderson et al. | 710/52 |
| 5,875,313 | 2/1999 | Sescila, III et al. | 710/129 |
| 5,887,146 | 3/1999 | Baxter et al. | 710/104 |
| 5,903,718 | 5/1999 | Marik | 714/38 |
| 5,909,559 | 6/1999 | So | 710/127 |
| 5,953,511 | 9/1999 | Sescila, III et al. | 710/129 |

OTHER PUBLICATIONS

Diamond, Stephen L., "IEEE 1394: status and growth path," IEEE Micro, vol. 16, Issue 3, pp. 75–78, Jun. 1996.

Hoffman et al., "IEEE 1394: a ubiquitous bus," Digest of Papers of Compcon '95, Technologies for the Information Superhighway, pp. 334–338, Mar. 1995.

*Primary Examiner*—Tariq R. Hafiz
*Assistant Examiner*—Tuan Q. Dam
*Attorney, Agent, or Firm*—Trop, Pruner, Hu & Miles, P.C.

[57] ABSTRACT

A first program is executed in a first computer. The execution of the first program includes storing data in a region of a memory of the first computer. During the execution of the program, an indication of the data is serially transmitted to a second computer. The second computer generates a copy of the data from the indication and executes a second program to analyze the indication to evaluate a performance of the first program.

12 Claims, 5 Drawing Sheets

REMOTELY MONITORING EXECUTION OF A PROGRAM

BACKGROUND

The invention relates to remotely monitoring execution of a program.

In the development of an application program, the behavior of the program may be monitored to both debug the program and evaluate a performance (an execution speed, for example) of the program. For example, the execution of the program (by a microprocessor) may be closely monitored to detect errors, or "bugs," in the program. This monitoring, often referred to as "debugging," may include examining the contents of a region in memory called a workspace that stores temporary and continually changing data for the program. As examples, the workspace may store data for tables and symbols and may serve as a "scratch pad" for the program.

By monitoring the data stored in the workspace, errors in the program may be detected, as the actual data in the workspace may be compared to predetermined data, for example. However, the methodology used to monitor the program may affect the execution of the program itself and thus, may not be an accurate indicator of the program's behavior. For example, for a multitasking environment, a debugger program may be one task that is executed by the microprocessor to monitor the execution of an application program that is a separate task. In this manner, the debugger program may consume resources (memory space, bus bandwidth and processor time, as examples) of the computer which may affect the execution of the application program. Therefore, the debugger program may not, under these circumstances, be used to accurately evaluate the application program's behavior.

Thus, there is a continuing need for an arrangement to monitor the execution of a program while minimally affecting the behavior of the program.

SUMMARY

In one embodiment, a method includes remotely monitoring execution of a program on a computer by serially transferring an indication of data being used by the program to another computer. This other computer uses the indication to analyze the data to evaluate a behavior of the program.

In another embodiment, a method includes executing a program in a first computer. The execution of the program includes storing data in a region of a memory of the first computer. During the execution of the program, an indication of the data is serially transmitted to a second computer. The second computer uses the indication to generate a copy of the data and uses the copy to evaluate a behavior of the program.

In yet another embodiment, a system includes a serial bus and two computers. One of the computers includes a memory and a processor. The processor executes a first program to store data in a region of the memory. While the first program is executing, a first serial interface of this computer transmits an indication of the data to the serial bus. The other computer includes another serial interface that receives the indication from the serial bus. The other computer uses the indication to evaluate a behavior of the first program.

Advantages and other features of the invention will become apparent from the following description, from the drawing and from the claims.

DETAILED DESCRIPTION

Figure 1:
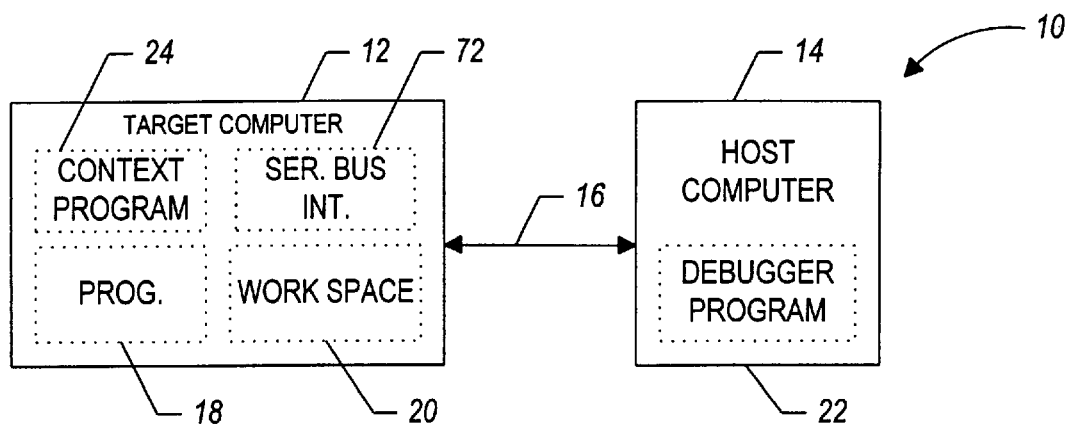
FIG. 1 is a block diagram of a system that includes a host computer and a target computer which may communicate with each other via a serial bus.

Referring to FIG. 1, an embodiment 10 of a system in accordance with the invention includes two computers: a target computer 12 that executes a program 18 and a host computer 14 that remotely monitors execution of the program 18 to evaluate the program's behavior. The monitored behavior may be used, for example, to debug the program 18 or monitor a performance (an execution speed, for example) of the program 18.

To accomplish this, in some embodiments, the two computers 12 and 14 communicate with each other via a serial bus 16 (e.g., a serial bus compliant with the 1394-1995 High Performance Serial Bus, IEEE, 1995). As the target computer 12 executes the program 18, the target computer 12 transmits signals to the serial bus 16. These signals indicate data that is stored in a memory workspace 20 (of the target computer 12) that is used by the program 18. The host computer 14 receives these signals from the serial bus 16, and based on these signals, reconstructs a copy of the data that is stored in the workspace 20. The host computer 14 may, for example, execute a debugger program 22 to analyze the copy of the data to evaluate the behavior of the program 18.

The workspace 20 may store, as examples, temporary data for the target computer 12, such as values for tables, values for scratch pad calculations, and values for parameters or symbols being used by the program 18. In this manner, the data stored in the workspace 20 may be used by the host computer 14 to determine whether the program 18 is performing properly and may be used to debug the program 18.

For example, a test may be performed that includes providing predetermined input data to the program 18. The program 18 processes the input data to form data that is stored in the workspace 20. The resulting data that the program 18 stores in the workspace 20 is then compared (by the host computer 14) with predetermined data from a properly functioning program to evaluate behavior of the program 18.

As described below, in some embodiments, the host computer 14 may submit requests to a serial bus interface 72 of the target computer 12. In response to these requests, the serial bus interface 72 transfers data from the workspace 20 to the serial bus 16. As a result, the execution of program 16 remains unperturbed while the execution is being monitored by the host computer 14. For the case of debugging, as the program 18 is being executed and the data in the workspace 20 changes, the copy of the data being evaluated by the debugger program 22 is continuously updated to reflect these changes.

In some embodiments, the host computer 14 may redefine the boundaries of the workspace 20 (i.e., redefine the memory locations that form the workspace 20) as the target computer 12 executes the program 18. In this manner, the debugger program 22 may evaluate different routines or subsets of the program 18 as the program 18 is being executed. The debugger program 22 may redefine the memory locations that form the workspace 20 to, as examples, trace the source of an error or evaluate other routines of the program 18.

As examples, the workspace 20 may include a single contiguous region of the target computer's 12 memory or may be formed from several non-contiguous regions of the memory.

The advantages of remotely monitoring the execution of a program may include one or more of the following. Disturbances to the execution of the program by the debugger program may be minimized. No additional hardware or software may need to be installed in the target computer. The monitoring of the program may be transparent to the program. Other advantages may be possible.

To accomplish the above-described features, in some embodiments, the host computer 14 uses the serial bus 16 to gain access to the physical memory address space of the target computer 12. By gaining access to the physical memory space, the host computer 14 may, as examples, directly read data from the workspace 20 and may directly write to the memory of the target computer 12 to store an input/output (I/O) program, described below.

As described below, in some embodiments, the I/O program may cause the target computer 12 to continuously transmit signals to the serial bus 16 that are representative of the data in the workspace 20. These transmissions occur automatically without being specifically requested by the host computer 14. As a result of the I/O program (described below), the target computer 12 may continuously update the host computer 14 with copies of the data that is stored in the workspace 20.

Figure 2:
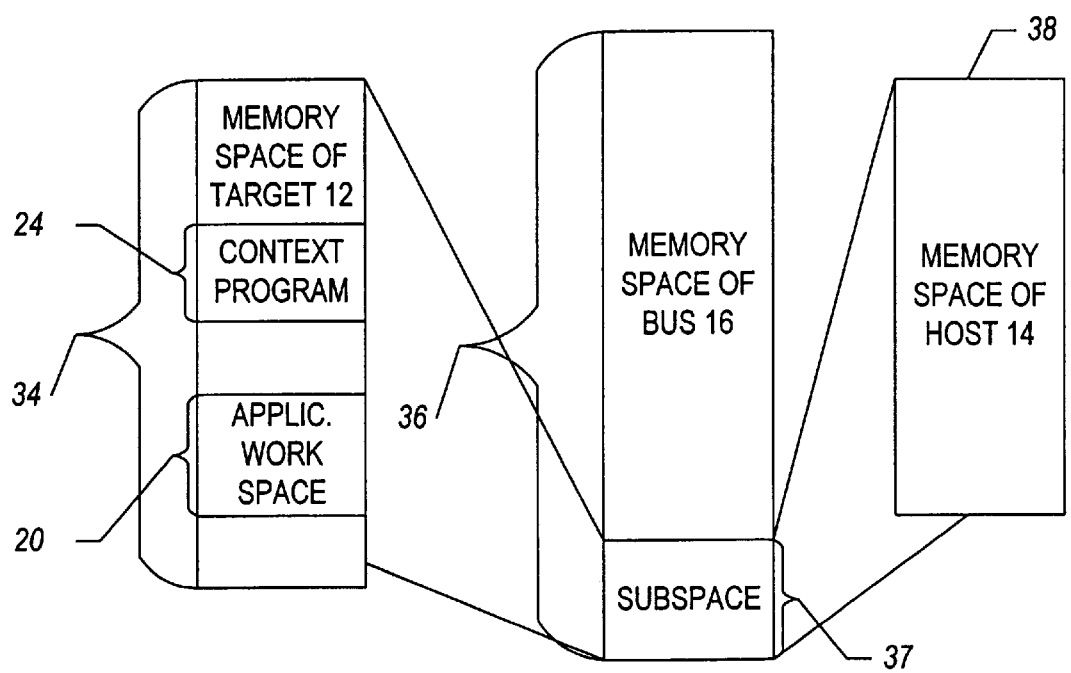
FIG. 2 is a schematic diagram illustrating memory address spaces for the computers and the serial bus of FIG. 1.

In some embodiments, the target 12 and host 14 computers may both implement an arrangement as specified in the 1394 Open Host Controller Interface (HCI) Specification, Draft 0.97, Sep. 19, 1997, by the Promoters of the 1394 Open HCI. Under this arrangement, the serial bus 16 provides a link that permits the host computer 14 to directly access a physical memory address space 34 (see FIG. 2) of the target computer 12. This direct access is due to a direct mapping between the memory address space 34 and a physical memory address subspace 37 of the serial bus 16. The physical memory address subspace 37 is a subset of a memory address space 36 of the serial bus 16. As an example of the sizes of the memory address spaces, the address space 34 may be a thirtytwo bit address space, the memory address space 36 may be a sixty-four bit address space, and the physical memory address subspace 37 may be a thirty-two bit address space. The address subspace 37 also permits the target computer 12 to directly access a memory address space 38 (a thirty-two bit address space, for example) of the host computer 14.

When accessing the memory address space 34 of the target computer 12, the host computer 14 conforms to a protocol of the serial bus 16. This protocol regulates how packets of information (indicated by signals on the serial bus 16) are communicated over the serial bus 16.

In some embodiment, the packets may be communicated asynchronously across the serial bus 16. In a typical asynchronous transmission, a request packet is transmitted by one computer 12, 14 to request an action (a read or write operation, for example) to be performed by the other computer 12, 14. In response to the request packet, the other computer 12, 14 performs the requested action and furnishes a response packet that includes acknowledgement of the performance of the action and data, if requested. As an example, the host computer 14 might transmit an asynchronous read request packet to request data from the target computer 12. In response, the target computer 12 furnishes the requested data in the form of an asynchronous read response packet. Write request/response packets follow a similar protocol. Isochronous communication of the packets is further described in the 1394 Open HCI Specification.

The asynchronous packet may be either a physical or a logical packet. To distinguish between the two, each asynchronous packet includes an address that, depending on its value, controls whether the packet is a logical packet or a physical packet. If the address falls within certain address ranges of the memory address space 36 of the serial bus 16, the packet is deemed to be an asynchronous logical packet, and for this type of packet, the computer 12, 14 uses four logical channels, or contexts, to communicate with the serial bus 16: one context to transmit logical request packets, one context to transmit logical response packets, one context to receive logical request packets and one context to receive logical response packets. The specifics of each context may be programmed via a context program which is an I/O program that specifies buffer(s) to be logically formed in the memory of the computer 12, 14 to furnish/receive data in connection with the context.

For example, a context program written for the context to transmit logical request packets may specify region(s) in the system memory from which data is to be gathered to build the logical request packets. As another example, a context program written for the context to receive logical response packets may specify region(s) in the system memory into which data from the received response packets is to be stored.

If the address of the asynchronous packet falls within the subspace 37, then the packet is deemed to be a physical packet. Otherwise, the packet is treated as being an asynchronous logical packet, and the address serves as a logical identifier to software of the computer 12, 14. However, for physical packets, the address of the packet is treated as directly addressing either the computer memory space 34 or 38, depending on the direction of the packet's transmission across the serial bus 16.

In this manner, to asynchronously read from (or write to) the memory space 34 of the target computer 12, the host computer 14 transmits signals to the serial bus 16 which indicate a read (or write) request packet. The packet includes an address. When this address is within the subspace 37, the target computer 12 treats the packet as requesting a direct physical memory access and responds by accessing the same address in the memory address space 34 to service the request.

Similarly, to read from (or write to) the memory of the host computer 14, the target computer 12 furnishes signals to the serial bus 16 which indicate a read (or write) request packet. If the address of this packet is within the address space 37, then the host computer 14 treats the packet as requesting a direct memory access and responds by accessing the same address in the memory address space 38 to service the request.

One way for the host computer 14 to access data stored in the workspace 20 during execution of the program 18 is to transmit (via the serial bus 16) an asynchronous, physical read request packet (to the target computer 12) to request data from the workspace 20. The target computer 12 responds to the request packet by assembling the data from the workspace 20 into one or more read response packet(s) and transmitting the response packet(s) (via the serial bus 16) back to the host computer 14.

Another way for the host computer 14 to access data stored in the workspace 20 during execution of the program 18 is for the target computer 12 to continuously transmit (via the serial bus 16) asynchronous, logical write request packets (to the target computer 12) that include data from the workspace 20. To accomplish this, in some embodiments, the host computer 14 programs the target computer 12 (via an I/O program) to perform this function.

This programming might include the host computer 14 communicating a sequence of physical write request packet(s) to the bus 16 to store a context program 24 in the memory of the target computer 12. The context program 24, in turn, controls the logical context of the target computer 12 through which asynchronous, logical write requests (that include a copy of the data stored in the workspace 20) are communicated to the serial bus 16. Thus, in effect, the context program 24 controls the manner in which the target computer 12 assembles a copy of data from the workspace 20 to form packets that are communicated to the host computer 14 via the serial bus 16. The host computer 14 receives each write request packet, furnishes a write response packet in response, and uses the data indicated by the write request packets to analyze performance of the program 18.

Figure 3:
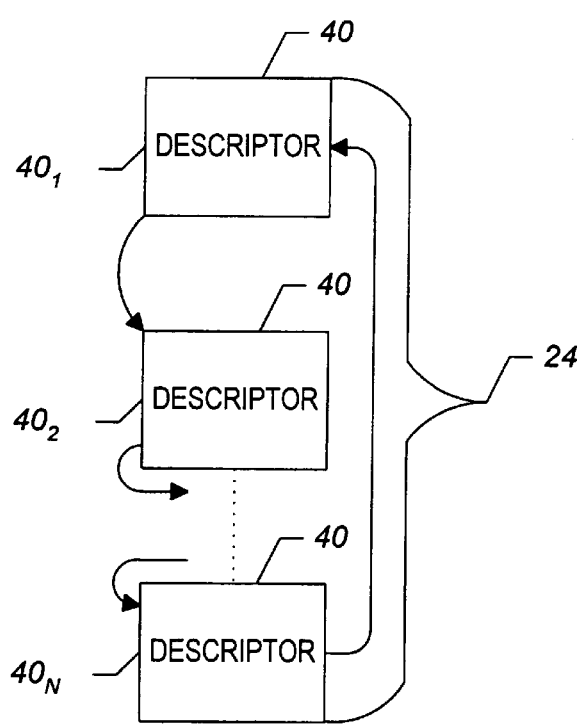
FIG. 3 is a schematic diagram illustrating a context program that is stored in a memory of the target computer.

Referring to FIG. 3, the context program 24 includes one or more descriptors 40 (descriptors $40_1$, $40_2$, ... $40_N$, as examples) that specify how packets are to be assembled for the logical context. As examples, one of the descriptors 40 might describe a packet header which may include a logical address for the packet. Other descriptors 40 may specify the regions in the memory address space 34 that define the workspace 20. In this manner, the descriptors 40 specify the memory locations where data is to be retrieved to form the packet(s).

In general, the target computer 12 processes descriptors 40 one at a time in a sequence defined by the descriptors 40. In this manner, each descriptor 40 references the next descriptor 40 for processing. However, in some embodiments, the last descriptor 40 in the sequence may not reference another descriptor 40 and thus, may terminate the context program 24, and in some embodiments, the last descriptor $40_N$ may reference the first descriptor $40_1$ so that the context program 24 forms a continuous loop so that data from the workspace 20 is continuously communicated from the target computer 12 to the host computer 14.

Figure 4:
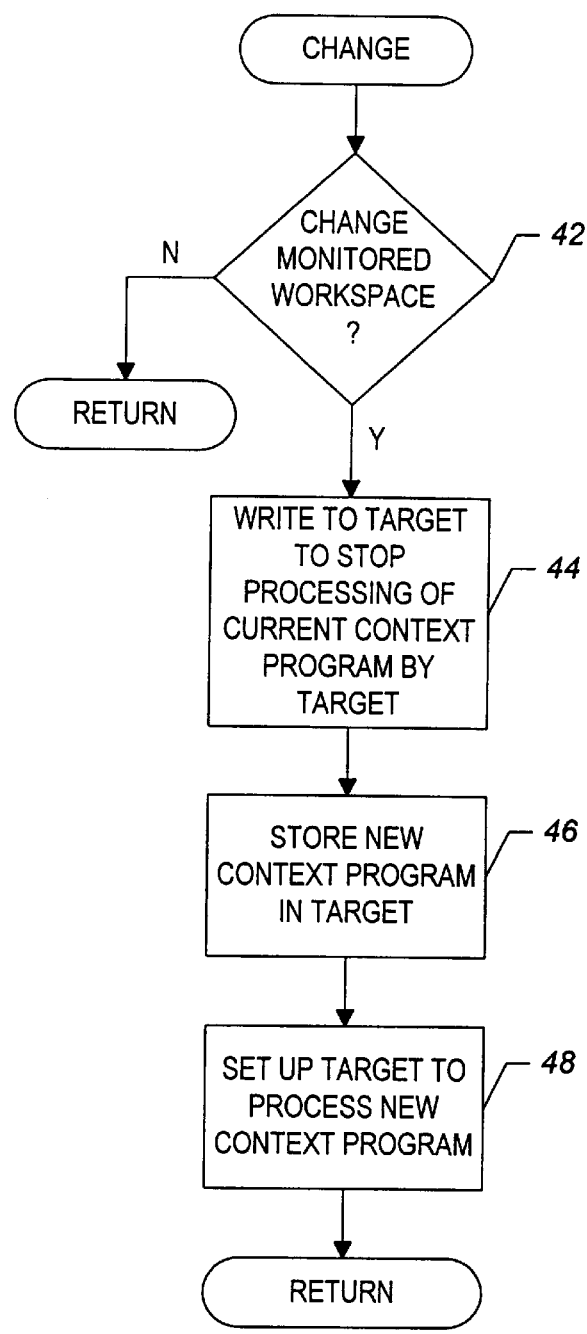
FIG. 4 is a flowchart illustrating an algorithm for storing the context program in the memory of the target computer.

The host computer 14, when executing the debugger program 22, may want to change the memory locations of the workspace 20. For these cases, in some embodiments, the host computer 14 changes the context program 24 by writing over an older version of the program 24 (stored in the memory of the target computer 12) with a newer version. In this manner, when the host computer 14 determines (diamond 42 (see FIG. 4)) that a change in the memory locations that define the workspace 20 is needed, the host computer 14 communicates (block 44) a physical write request packet to the target computer 12. This packet addresses a control register of the target computer 12, and the resulting data written to the control register causes the target computer 12 to stop executing the current context program 24. This suspension of the execution of the context program 24 allows the older version of the program 24 to be replaced.

Next, the host computer 14, via one or more physical write request packets, replaces (block 46) the older version of the context program 24 with a newer version. The host computer 14 then transmits (block 48) another physical write request packet to update the control register to cause the target computer 12 to resume processing the newer version of the context program 24. The bits changed by the physical write request packets are further described in the 1394 Open HCI Specification.

Figure 5:
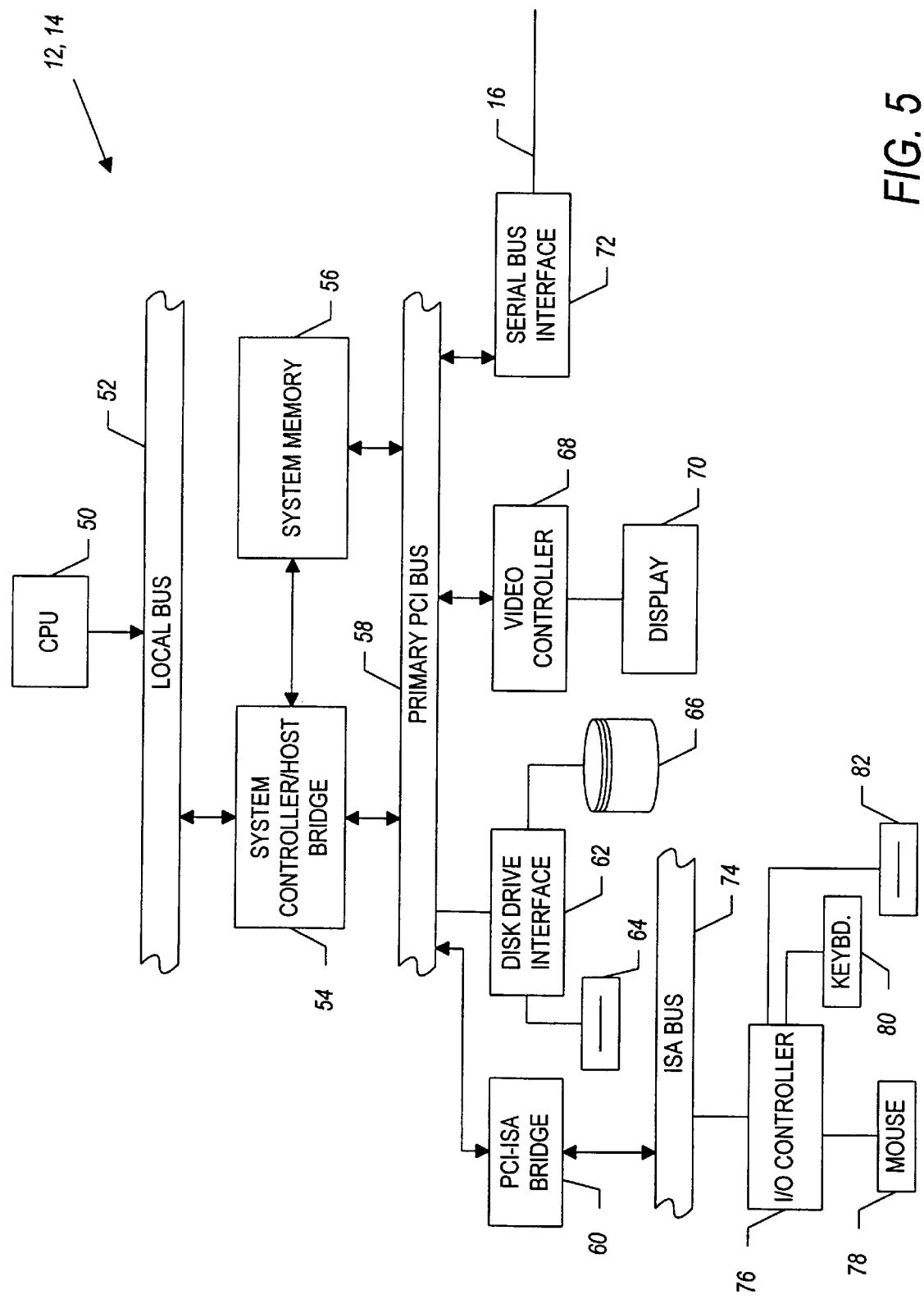
FIG. 5 is a block diagram of a computer.

Referring to FIG. 5, in some embodiments, the target computer 12, the host computer 14 or both computers may include a microprocessor 50 that executes programs (the context program 24 and the program 18, as examples) that are stored in a system memory 56. A system controller/host bridge 54 controls access to the system memory 56 and provides an interface between a local bus and a primary Peripheral Component Interconnect (PCI) bus 58 (e.g., a bus compliant with the PCI specification, version 2.0, available from PCI Special Interest Group, Portland, e.g. 97214). The microprocessor 50, system controller/host bridge 54 and system memory 56 are all coupled to a local bus 52.

A serial bus interface 72, coupled to the PCI bus 58, furnishes an interface between the serial bus 16 and the computers 12, 14. The serial bus interface 72 may function both as an initiator (to gain access to the memory 56, for example) and as a target on the PCI bus 58. For physical request or response packets, the serial bus interface 72 accesses the location in system memory 56 that is indicated by the address of the response/request packet. For logical request or response packets, the serial bus interface 72 executes context programs (stored in the memory 56) to determine which regions of the system memory 56 are to be accessed.

Besides the serial interface 72, the computer 12, 14 may have other circuitry, such as a video controller 68, that controls a display 70; a disk drive interface 62 that controls a CD-ROM drive 64 and a hard drive 66; and an I/O controller 76 that receives input from a keyboard 80 and a mouse 78 and controls a floppy disk drive 82. The disk drive interface 62 and the video controller 68 may be coupled to the PCI bus 58. The I/O controller 76 may be coupled to an expansion bus 74 that is interfaced to the PCI bus 58 through a bridge 60.

Figure 6:
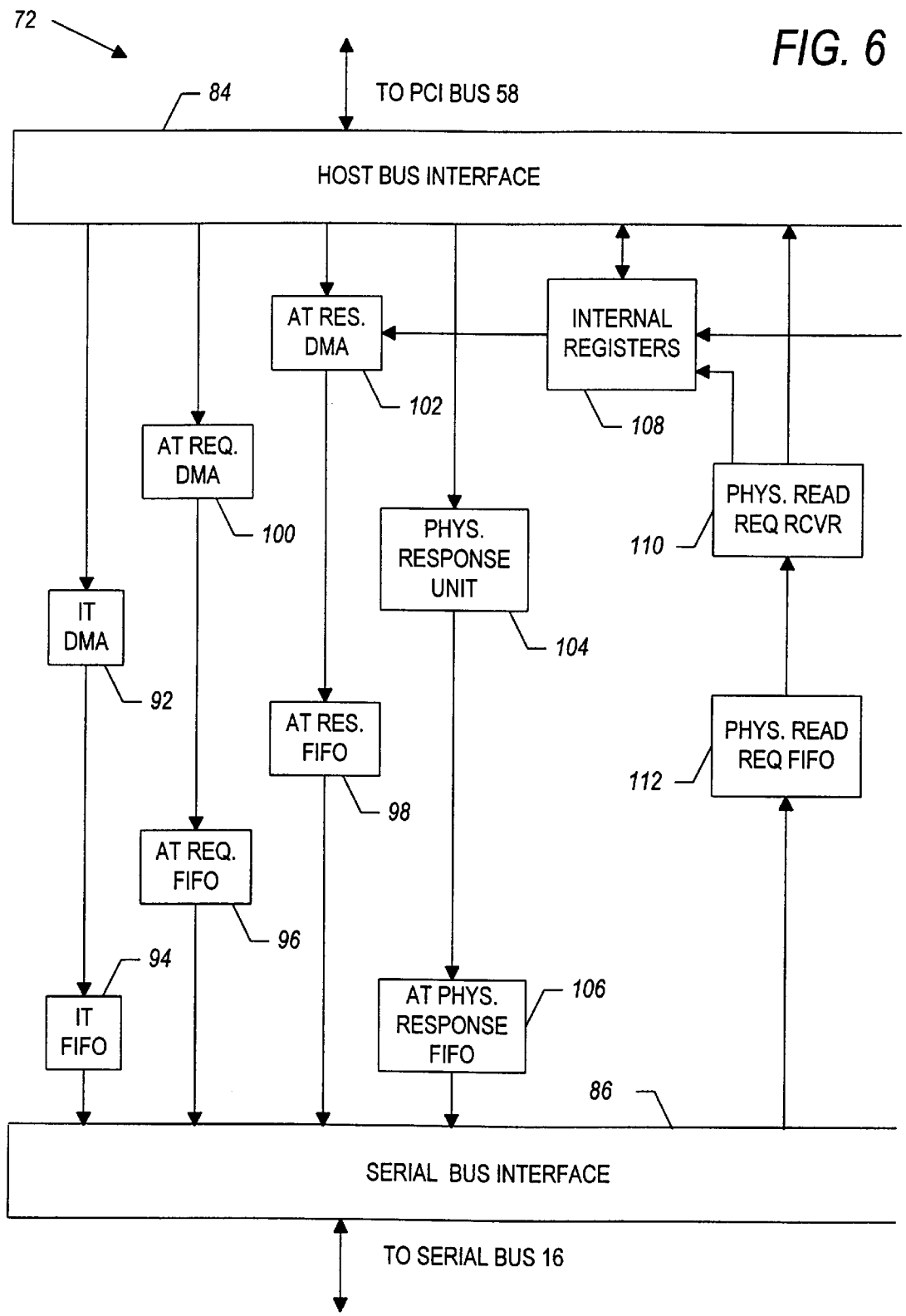
FIGS. 6 and 7 are a block diagram of a serial interface of the computer of FIG. 5.
Figure 7:
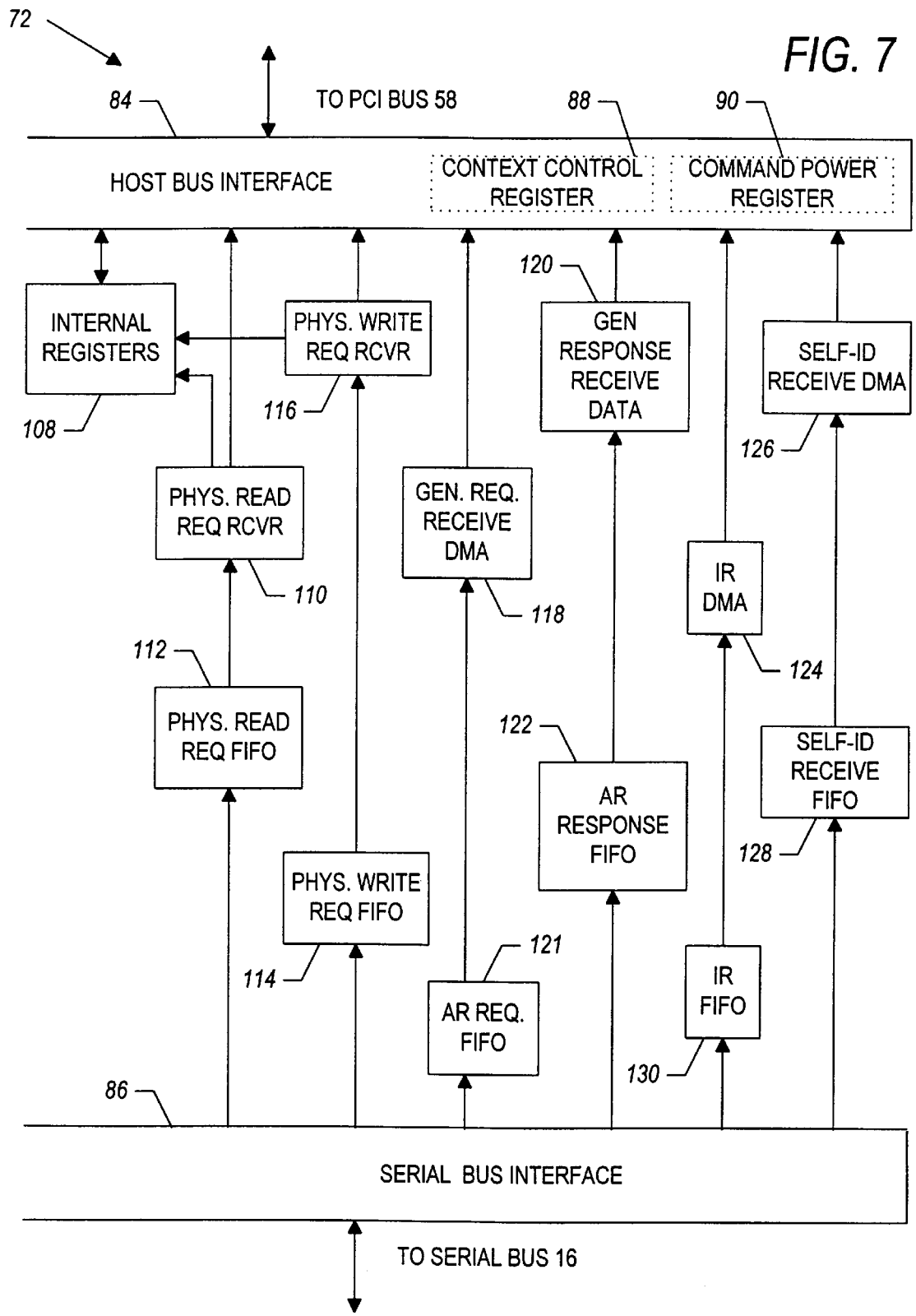

Referring to FIGS. 6 and 7, the serial bus interface 72 includes a host bus interface 84 which is coupled to the PCI bus 58 and serves as a PCI bus master to transfer packets between the system memory 56 and the serial bus 16. For physical request and response packets, the host bus interface 84 accesses specific locations in the system memory 56 based on the address of the corresponding physical request/response packet. For logical request and response packets, the host bus interface 84 accesses specific locations in the memory 56 based on the addresses specified by the relevant context program.

For each logical context, the host bus interface 84 includes a context control register 88 and a command pointer register 90, both of which may be written to by either the target 12 or the host 14 computer. In this manner, the context control register 88 may be used to control execution of a context program for a particular context. The command pointer register 90 stores a value that points to the memory address of the first descriptor block of the context program.

The serial bus interface 72 also includes an interface 86 which, among other things, furnishes signals to the serial bus 16 in the proper format and sequence to represent the packets. The interface 86 also decodes signals from the serial bus 16 to reconstruct the data of the received packets. The interface 86 stores received packet data in receive first-in-first-out (FIFO) memories 112, 114, 121, 122, 128 and 130 of the interface 86 and retrieves packet data from transmit FIFO memories 94, 96 98 and 106 of the interface 86. The interface 86 also includes direct memory access (DMA) engines 118, 120, 124 and 126 that interact with the host bus interface 84 to control the reception of packet data into the system memory 56; and DMA engines 92, 100 and 102 that interact with the host bus interface 84 to control the flow of data from the memory 56 to the serial bus interface 86.

The isochronous transmit DMA engine 92, the asynchronous transmit request DMA engine 100, the asynchronous transmit response DMA engine 102, the general request receive DMA engine 118, the general response receive DMA engine 120 and the isochronous receive DMA engine 124 are all programmable by context programs. The self-ID receive DMA engine 126 is not. Also, for physical responses, the serial interface 72 includes a physical response unit 104 which is not programmable by a context program. For physical write and read requests, the interface 72 includes a physical read request receiver 110 and a physical write request receiver 116, respectively. The DMA engines and FIFO memories are further described in the 1394 Open HCI Specification.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method comprising:
   excecuting a first program in a first computer including storing data in a region of a memory of the first computer;
   during the execution of the program, serially transmitting an indication of the data to a second computer;
   receiving the indication and generating a copy of the data from the indication; and
   executing a second program in the second computer to used the copy to evaluate a behavior of the first program without altering an execution flow of the first program.

2. The method of claim 1, wherein the act of using includes using the second computer to execute a second program.

3. The method of claim 1, further comprising:
   during the execution of the program, programming the first computer to serially transmit other data from another region of the memory to the second computer.

4. The method of claim 3, wherein the programming of the first computer includes transmitting a serial I/O program from the second computer to the first computer.

5. The method of claim 1, wherein the act of transmitting includes continuously reading the data from the region.

6. A system comprising:
   a serial bus;
   a first computer comprising:
      a memory;
      a first processor to execute a first program to store data in a region of the memory, the first program not including execution flow alterations for purposes of evaluating a behavior of the first program; and
      a first serial interface to transmit an indication the data to the serial bus during the execution of the first program; and
   a second computer comprising:
      a second serial interface to receive the indication and generate a copy of the data; and
      a second processor to execute a second program to use the copy to evaluate the behavior of the first program.

7. The computer system of claim 6, wherein the second processor further executes a second program to evaluate the behavior of the first program.

8. The system of claim 6, wherein the second processor configures the first serial interface to transmit a representation of the copy.

9. The system of claim 8, wherein the configuration occurs during the execution of the first program.

10. The system of claim 6, wherein the serial bus comprises an IEEE 1394 serial bus.

11. An article comprising a computer readable storage medium storing instructions that cause a first computer to:
   configure a second computer to serially transmit an indication of data stored in a first memory region of the second computer while the second computer is executing a program without altering an execution flow of the program for purposes of evaluating a behavior of the program; and
   analyze a copy of the data formed from the indication to evaluate the behavior of the program.

12. The article of claim 11, wherein the instructions further cause the first computer to:
   during execution of the program, configure the second computer to serially transmit other data stored in a second memory region of the second computer.

* * * * *